United States Patent
Ebeling et al.

(10) Patent No.: US 9,606,573 B1
(45) Date of Patent: Mar. 28, 2017

(54) CONFIGURABLE CLOCK GRID STRUCTURES

(71) Applicant: Altera Corporation, San Jose, CA (US)

(72) Inventors: Carl Ebeling, Redwood City, CA (US); Dana How, Palo Alto, CA (US); Herman Henry Schmit, Palo Alto, CA (US); Vadim Gutnik, Mountain View, CA (US); Ramanand Venkata, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/752,393

(22) Filed: Jun. 26, 2015

Related U.S. Application Data

(60) Provisional application No. 62/057,450, filed on Sep. 30, 2014.

(51) Int. Cl.
*H03K 3/00* (2006.01)
*G06F 1/08* (2006.01)

(52) U.S. Cl.
CPC ..................... *G06F 1/08* (2013.01)

(58) Field of Classification Search
CPC .......................................................... G06F 1/08
USPC .......................................................... 327/294
See application file for complete search history.

(56) References Cited

U.S. PATENT DOCUMENTS

| | | | | |
|---|---|---|---|---|
| 5,656,950 A | * | 8/1997 | Duong | H03K 19/018592 326/39 |
| 7,317,331 B2 | * | 1/2008 | Teig | H03K 19/17776 326/38 |
| 2005/0076187 A1 | * | 4/2005 | Claydon | G06F 1/3243 712/11 |

* cited by examiner

*Primary Examiner* — Lincoln Donovan
*Assistant Examiner* — Metasebia Retebo
(74) *Attorney, Agent, or Firm* — Fletcher Yoder, P.C.

(57) ABSTRACT

Circuitry accepts an input signal and distributes the input signal to a plurality of locations within the circuitry. The circuitry includes a first circuit element and a second circuit element. The circuitry further includes a first plurality of wire segments that are substantially aligned to form a first bundle, and include a first wire segment. The circuitry further includes a second plurality of wire segments that are substantially aligned to form a second bundle, and have a second wire segment. An intersection element of the first bundle and the second bundle includes a first interconnecting wire segment that connects the first wire segment and the second wire segment, and the input signal is routed from the first wire segment to the second wire segment via the first interconnecting wire segment. The input signal is further transmitted to the second element from the second wire segment.

25 Claims, 10 Drawing Sheets

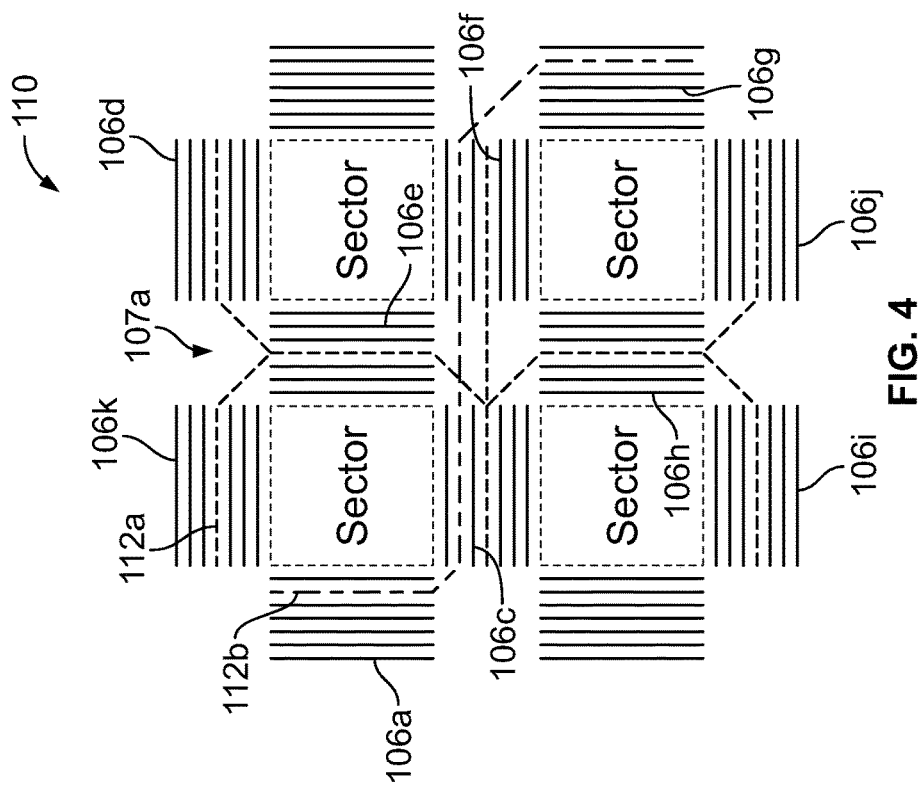
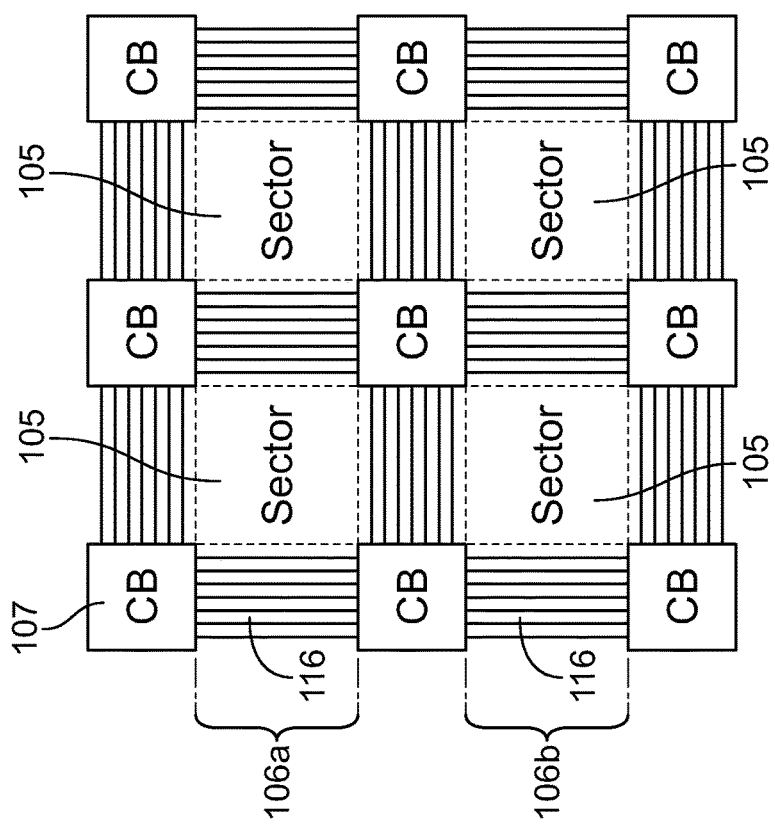

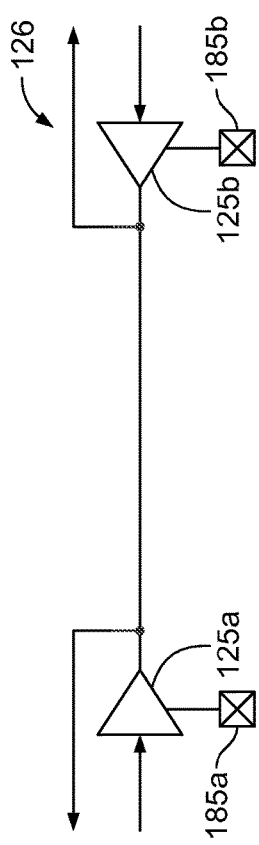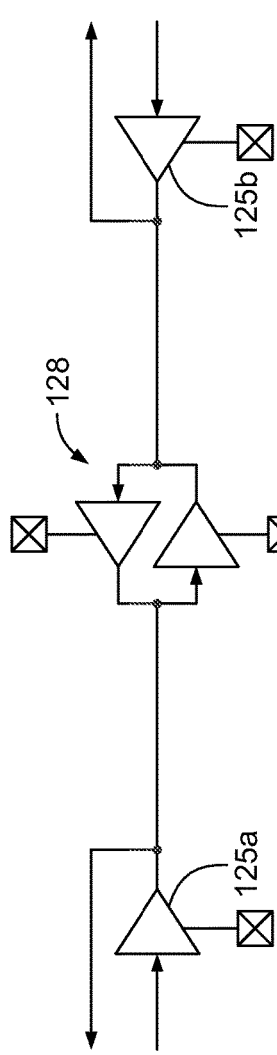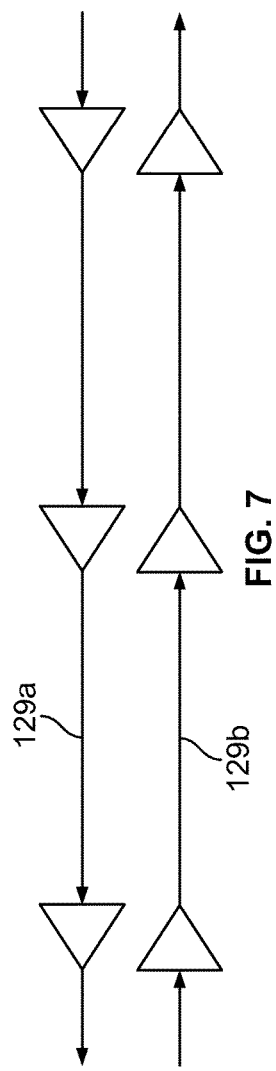

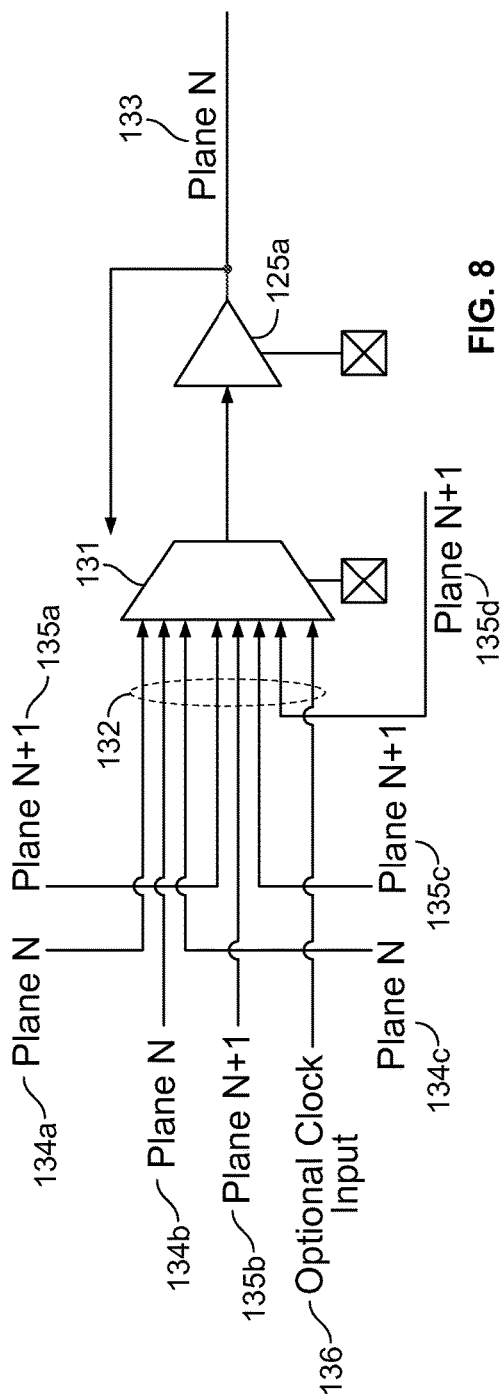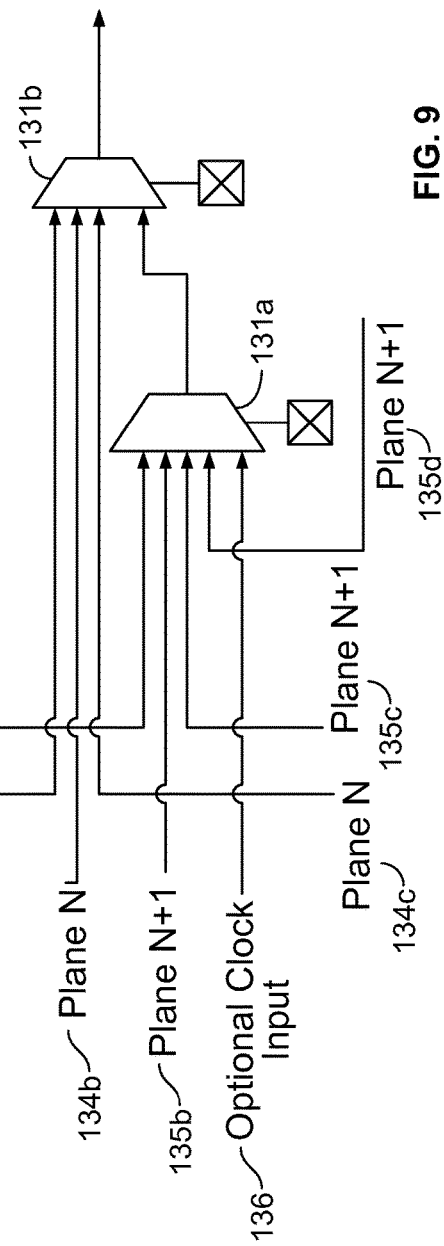
FIG. 8
FIG. 9

CONFIGURABLE CLOCK GRID STRUCTURES

CROSS REFERENCE TO RELATED APPLICATIONS

This claims the benefit of commonly-assigned U.S. Provisional Patent Application No. 62/057,450, filed on Sep. 30, 2014, which is hereby expressly incorporated by reference in its entirety.

FIELD OF THE INVENTION

This invention relates to a configurable clock grid that can be used to construct a number of clock trees of arbitrary sizes and shapes for distributing clock signals in an electronic device.

BACKGROUND OF THE INVENTION

Synchronous systems usually use clock signals to operate various components of the circuit. Large complex systems generally have a number of clock signals, each of which drives a set of registers, known as a clock region. Devices route each of these clock signals from the clock source to all the registers that use that clock. The routing of clock signals is often done in such a way that minimizes both the delay and the skew in the delay from the source to the registers. Some devices provide fixed and dedicated clock trees to route clock signals. These clock trees are constructed using fast wires, such that that all routes from the tree root to the leaves are balanced. These wires can often be shielded to provide well-controlled delays. Some trees may span the entire device, while others may span only a subset of the device.

When a circuit is mapped to a device, the registers of a clock region are assigned locations within the device. The clock assigned to a clock region is distributed to registers using a clock tree. Depending on the location of the registers in a clock region, one of a set of fixed clock trees can be selected, the clock source is routed to the root of the tree, and the registers are configured to select the clock tree as the clock input. This process is repeated for all registers in the device.

There can be a large number (e.g., hundreds) of different clock regions in a system. Some clock regions are relatively small in size while other clock regions may span the entire device. Providing the clock signals for all the clock regions can include using a large number of clock trees. When these trees are fixed, then the registers of a clock region may be constrained to fixed locations based on the fixed tree selected for that clock region. As a result, the clock tree selected for the clock region can span the entire area containing registers from that region. In this case, designing a set of appropriately-sized fixed clock trees that are sufficient across the large number of registers and can be programmed into a single device can be challenging. In practice, a significantly large number of fixed clock trees may be required such that all clock regions can be assigned a clock tree.

The excessive use of clock wiring involved in a large number of fixed clock trees can pose computer aided design (CAD) tool challenges as well. For example, it can result in fewer routing resources available for data signals, routing congestion, crosstalk effects on timing analysis, variability noise, and/or the like. Due to the increased complexity with the large number of fixed clock trees, designing placement and clustering of registers to mitigate the negative effects can be difficult with the current CAD system. Therefore, the use and assignment of clock trees to fixed clock regions can constrain placement and clustering of registers, resulting in impaired circuit performance.

SUMMARY OF THE INVENTION

In accordance with embodiments of the present invention, a configurable clock grid containing uncommitted clock wires that can be configured to construct clock trees of arbitrary shape and size is introduced. Throughout this disclosure, the term "clock region" refers to the registers driven by a given clock signal, as well as the area of the device in which these registers are located. In addition to clock signals, the configurable grid structure described herein can also be applied to other high-fanout signals, such as, but not limited to reset and clock enable signals and/or other signals that can be communicated via clock trees in a device.

Therefore, in accordance with embodiments of the present invention there is provided circuitry that accepts an input signal and distributes the input signal to a plurality of locations within the circuitry. The circuitry includes a first circuit element and a second circuit element. The circuitry further includes a first plurality of wire segments disposed in proximity to the first circuit element. The first plurality of wire segments is substantially aligned to form a first bundle, and a first wire segment from the first plurality of wire segments is configured to route the input signal. The circuitry further includes a second plurality of wire segments disposed in proximity to the second circuit element. The second plurality of wire segments is substantially aligned to form a second bundle, and a second wire segment from the second plurality of wire segments is configured to route the input signal. The circuitry further includes an intersection element disposed at an intersection of the first bundle and the second bundle. The intersection element includes a first interconnecting wire segment that connects the first wire segment and the second wire segment, and the input signal is routed from the first wire segment to the second wire segment via the first interconnecting wire segment. The input signal is further transmitted to the second element from the second wire segment.

In accordance with another embodiment of the present invention there is provided circuitry accepting an input signal and distributing the input signal to a plurality of locations within the circuitry. The circuitry includes a first plurality of wire segments. The first plurality of wire segments is substantially aligned to form a first bundle, and a first wire segment from the first plurality of wire segments is configured to route the input signal. The circuitry further includes a second plurality of wire segments disposed in proximity to the first plurality of wire segments. The second plurality of wire segments is substantially aligned to form a second bundle, and a second wire segment from the second plurality of wire segments is configured to route the input signal. The circuitry further includes a third plurality of wire segments disposed in proximity to the first plurality of wire segments and the second plurality of wire segments. The third plurality of wire segments is substantially aligned to form a third bundle, and a third wire segment from the third plurality of wire segments is configured to route the input signal. The circuitry further includes a multiplexer component disposed at an intersection of the first bundle and the second bundle. The first wire segment and the second wire segment are connected to a multiplexing input end of the multiplexer component. The third wire segment is connected to a multiplexing output end of the multiplexer component. The input signal is routed from the first wire segment or the second wire segment to the third wire segment via the multiplexer component.

In accordance with another embodiment of the present invention there is provided circuitry accepting an input signal and distributing the input signal to a plurality of locations within the circuitry. The circuitry includes a first circuit element and a second circuit element. The circuitry further includes a first plurality of wire segments disposed in proximity to the first circuit element and the second circuit element. The first plurality of wire segments is substantially aligned to form a first bundle, and a first wire segment from the first plurality of wire segments is configured to route the input signal. The first wire segment has a bi-directional buffer that connects the first wire segment to the first circuit element and the second circuit element.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 3 shows an example block diagram illustrating an enlarged view of clock wire implementation between sectors;

FIG. 4 shows an example block diagram illustrating two example clock signals fed into the clock grid by connecting clock wire segments in adjacent channels;

FIGS. 5-7 shows various example circuit diagrams illustrating configurations of a clock wire segment;

FIGS. 8-9 show example circuit diagrams illustrating alternative implementations of a multiplexer(s) selecting a clock wire segment from an adjacent channel;

DETAILED DESCRIPTION OF THE INVENTION

Unless otherwise indicated, the discussion that follows will be based on an example of a programmable integrated circuit device such as an FPGA. However, it should be noted that the subject matter disclosed herein may be used in any kind of fixed or programmable device, including, but not limited to, an application-specific integrated circuit (ASIC).

Figure 1:
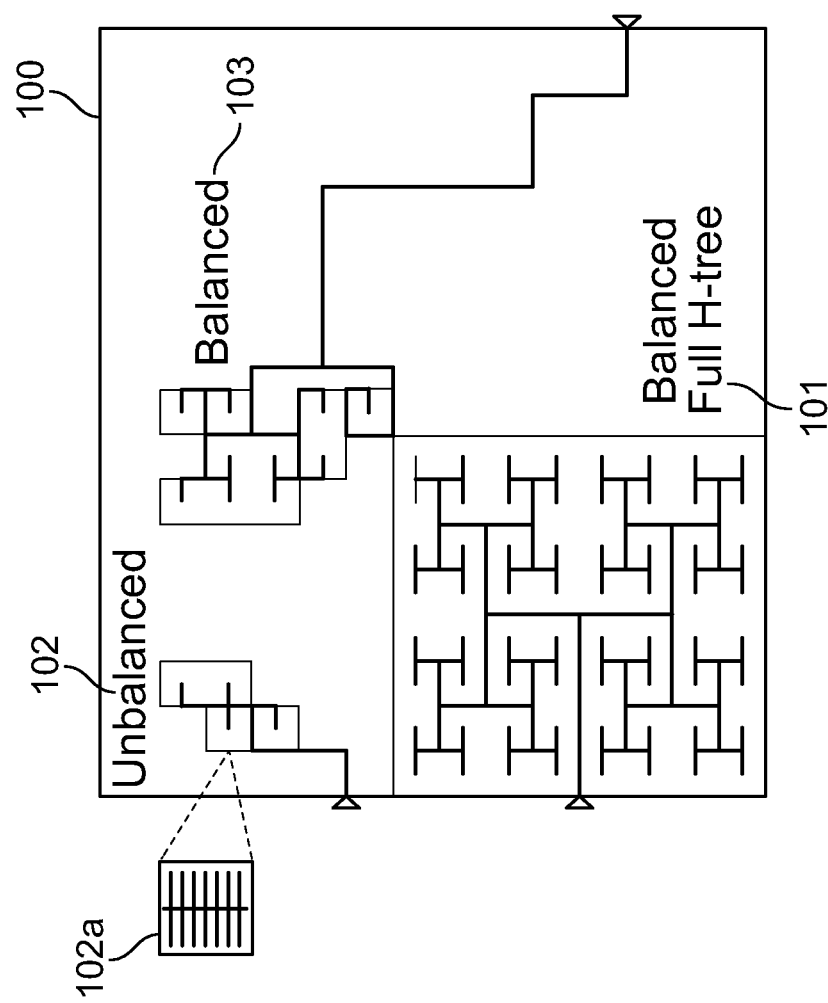
FIG. 1 shows an example block diagram of a circuit block 100 illustrating flexible configurations of a configurable clock grid.

FIG. 1 shows an example block diagram of a circuit block 100 illustrating flexible configurations of a configurable clock grid. As shown in FIG. 1, H-trees (e.g., 101-103) can be used in a circuit as a clock tree network to allow a clock signal or other global signals to be introduced at a single point on the block 100 and be delivered to all points within the entire device with reduced skew. The block 100 includes configurable H-tree elements, such as, but not limited, to a balanced full H-tree 101, an unbalanced H-tree 102 (which may include a fish-bone structure 102a), a balanced H-tree 103, and/or the like. Such H-tree elements are flexible to be configured, combined, integrated or disintegrated to generate a clock tree of arbitrary size and shape, and thus the clock wires can be used more efficiently. Due to the flexible configuration of H-tree elements, clock trees can be constructed with a size no larger than a desired size, and thus the delay through the constructed clock tree and power consumption is reduced. The flexibly configured clock tree can also reduce the constraints placed on the software that places and routes the circuit block 100 in the device, since a clock tree can be constructed specifically for a clock region. In addition, the flexibility provided by the configurable clock grid provides more freedom to the design tools for performance improvement. Further discussion on improved performance of clock grids can be found in copending, commonly-assigned U.S. patent application Ser. No. 14/137,086, filed on Dec. 20, 2013, which is hereby expressly incorporated by reference in its entirety.

Figure 2:
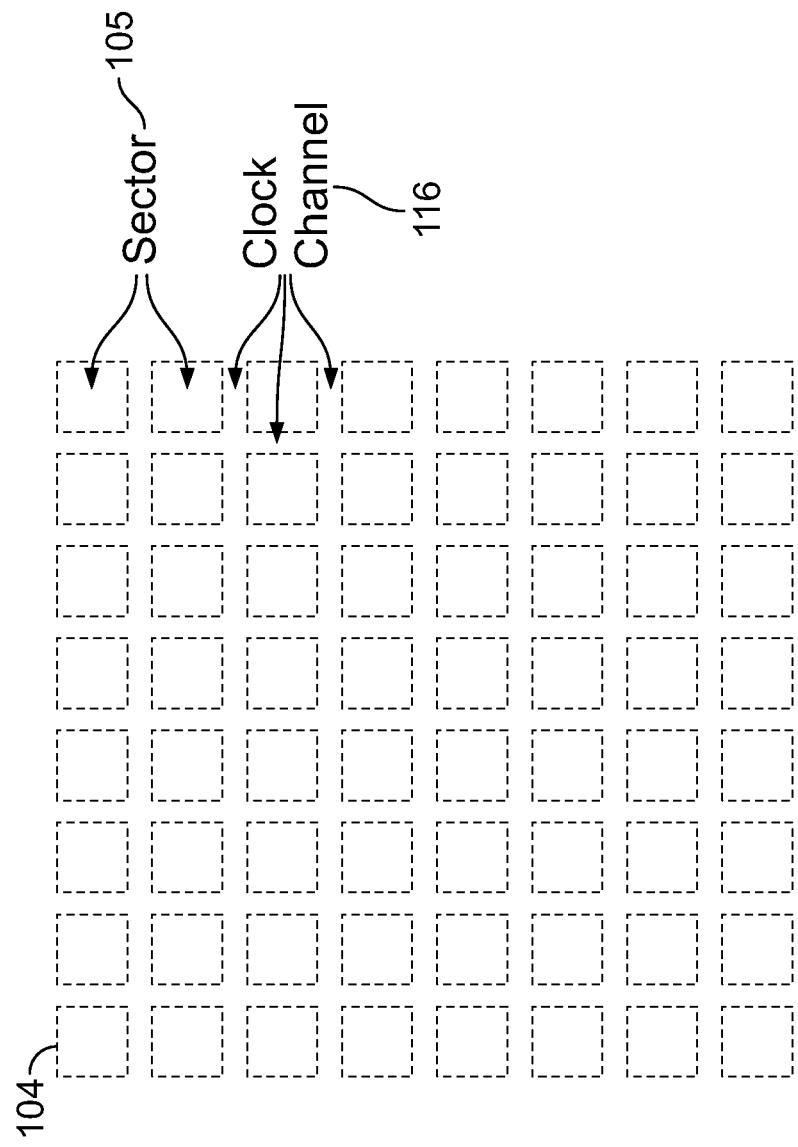
FIG. 2 shows an example representation of device area partitioned into a set of sectors arranged in a grid.

FIG. 2 shows an example representation of device area partitioned into a set of sectors arranged in a grid 104. The configurable clock grid can provide clock signals for a device composed of a set of regions called sectors 105, arranged in a grid 104 as shown in FIG. 2. The size of these sectors 105 can be chosen such that clock signals can be distributed to registers in the sector from a central point in the sector with minimal delay and close to zero skew. Although the sectors 105 are shown in a square shape in FIG. 2, the sectors can be of other shapes as long as the total size of each sector conforms to a sector aspect ratio. Various different schemes may be used to perform the clock distribution within a sector 105, including but not limited to balanced trees, fish-bones, and/or the like. A single sector can support a number of different clock signals, which are distributed from a location in the sector to the registers. Throughout this disclosure, it is assumed that clock signals are distributed from the sector center; however, this location could be anywhere in the sector since the delay in the sector is small.

The clock signals are transmitted via clock wires (e.g., see 106a-b in FIG. 3) that are placed in the channels between the sectors in the grid, e.g., see the clock channels 116 in FIG. 2. The clock wires can include one or more wires that are substantially aligned to form a bundle. For example, the wires may be placed parallel to each other (the wires may not necessarily be strictly parallel to each other, as long as they are placed at a similar position and angle to form a bundle). The clock channels 116 are shown in the respective example to be between the sectors, but the sectors could be placed closely to each other and the clock channels run over the top of the sectors. The clock wires are generally implemented on the top metal layers of the clock grid for low resistance, and thus the clock channels 116 could run over the sectors without disturbing the sectors themselves.

FIG. 3 shows an example block diagram illustrating an enlarged view of clock wire implementation between sectors such as sector 105 in FIG. 2. The clock wires in the channels 116 are divided into segments 106a-b that have a length equivalent to the sector width or height such that clock wire segments 106a-b can span a single sector in the clock channels. Each channel 116 contains a number of wire segments, for example 32, and/or the like. Although it can be assumed that all channels 116 have the same number of wire segments, it is possible for different channels to have different numbers of wire segments. For example, channels near the center of the chip or close to the clock sources may have more wire segments because the demand for clock signals may be higher.

Clock wire segments in adjacent channels can be connected using circuitry provided by a circuit connection block 107 (CB) placed between channels. For example, the circuit CB 107 can include an intersection of wire segments in adjacent channels, e.g., as shown in FIG. 4, clock wire segments 106k, 106d and 106e can intersect at CB 107a. The channels 116 can thus be connected together programmably to form longer clock wires comprising multiple segments. In addition, a wire in one channel can be connected to more than one wire in other channels to allow a clock tree to be constructed, e.g., as illustrated in FIG. 4.

FIG. 4 shows an example block diagram illustrating two example clock signals fed into the clock grid 110 by connecting clock wire segments in adjacent channels. For example, a clock tree 112b can be configured by connecting clock wires in clock wire segments 106a, 106c, 106f, and 106g; and another clock tree 112a can be configured by connecting clock wires in clock wire segments 106k, 106d, 106e, 106c, 106f, 106h, 106i, and 106j. Specifically, a clock wire from segment 106e is connected to two wires at the CB 107a, e.g., a wire in segment 106k and a wire in segment 106d, respectively.

FIGS. 5-7 show various example circuit diagrams illustrating configurations of a clock wire segment. In general, distributing a clock signal over a long distance with low delay may involve both periodic re-buffering and low-resistance wires, e.g., wires that are usually disposed at the top of a metal stack. As shown in FIG. 5, each of the wire segments in the clock grid is driven by buffers 125a-b at either end, which can be enabled by configuration bits input at pads 185a-185b, respectively. Thus, the direction of the clock signal in the wire segment 126 is determined by which buffer is enabled. Additional buffers can be inserted along a wire segment 126 to improve delay performance. For example, as shown in FIG. 6, a bidirectional buffer 128 is added between the two buffers 125a-b. Additionally, clock wires can be well-shielded to reduce the effect of cross-talk with other signals.

When bidirectional wires (e.g., see 128 in FIG. 6) introduce additional delay to the clock wire segment, they may be implemented in an alternative manner using a pair of unidirectional clock wires 129a-b as shown in FIG. 7. In either case, if a wire segment is unused, it is driven to a fixed value. Although the clock wire implementation shown in FIG. 7 may double the number of clock wires, the total number of clock wires may be controlled or even reduced if clock trees on the chip use or re-use each of the unidirectional wires 129a-b efficiently. If the direction in which clock segments are used to transmit clock signals is relatively balanced, then it may be generally possible to route two clock signals, in opposite directions, on one pair of wires, as shown at 129a-b in FIG. 7.

FIGS. 8-9 show example circuit diagrams illustrating alternative implementations of one or more programmable multiplexers selecting a clock wire segment from an adjacent channel. The multiplexers 131 in FIG. 8 or 131a-b in FIG. 9 can be placed at a channel intersection, e.g., CB 107 in FIG. 3, to selectively connect wire segments from adjacent channels. As previously discussed in connection with FIG. 4, clock wires in adjacent clock wire segments can be connected via the CB joints to form longer wires and clock trees for transmission of clock signals. The construction of long wires and clock trees in the grid can be done by adding a multiplexer 131 on the input of each clock buffer (e.g., similar to the buffer 125a shown in FIG. 5) at the end of the wire segments at the channel intersection. As an example, the multiplexing and buffering can be integrated as one functional circuit.

In one embodiment, the inputs 132 of the multiplexer 131 can include all of the other wire segments in the adjacent channels. In this way, complete flexibility can be provided, but at a very high cost. For example, when there are 32 clock wire segments in every channel, then each multiplexer would have 32×4−1=127 inputs, e.g., one for each segment in the four adjacent clock channels except for the segment the multiplexer is driving. Thus, the incurred hardware expense in this way could be significant.

FIG. 8 shows one example configuration of the multiplexer 131 to have a reduced number of inputs. For example, the wire segments in each clock channel can be numbered from 1 to 32 (assuming there are 32 wire segments in each clock channel); and the number assigned to each wire segment is referred to as the clock "plane". Each multiplexer 131 has 8 inputs (shown at 132). The multiplexer 131 that drives the wire segment N (e.g., see output to plane N 133) has 3 inputs connected to the wire segments N in each of the three other adjacent channels (e.g., see 134a-c), 4 inputs connected to the wire segments N+1 (modulo 32, to allow wrap-around) in all four adjacent channels (e.g., see 135a-d), and 1 optional input 136 to allow a clock signal to be inserted into the clock grid from a signal in a sector or a signal on the periphery. The circuit structure shown in FIG. 8 is a scalable connection architecture, because the size of the multiplexer 131 can remain constant even when the number of wire segments per clock channel varies, e.g., the multiplexer 131 can always have 8 inputs as discussed above, regardless of the number of the wire segments in an adjacent channel.

FIG. 9 shows an alternative implementation of the multiplexer 131 shown in FIG. 8. The 8-input multiplexer 131 in FIG. 8 can be alternatively implemented as a combination of two multiplexers 131a-b. The connections from plane N 134a-c are inputs to the second multiplexer 131b while the connections 135a-d from plane N+1 (along with the optional clock input 136) are connected to the first multiplexer 131a. In this case, the delay caused by the second 4-1 multiplexer 131b is less than the delay caused by an 8-1 multiplexer 131 (in FIG. 8). As it is more common to construct a clock tree staying on the same clock plane (e.g., only connecting planes N from the adjacent wire segments), the two-multiplexer structure in FIG. 9 can reduce the overall insertion delay through the clock tree.

Figure 10:
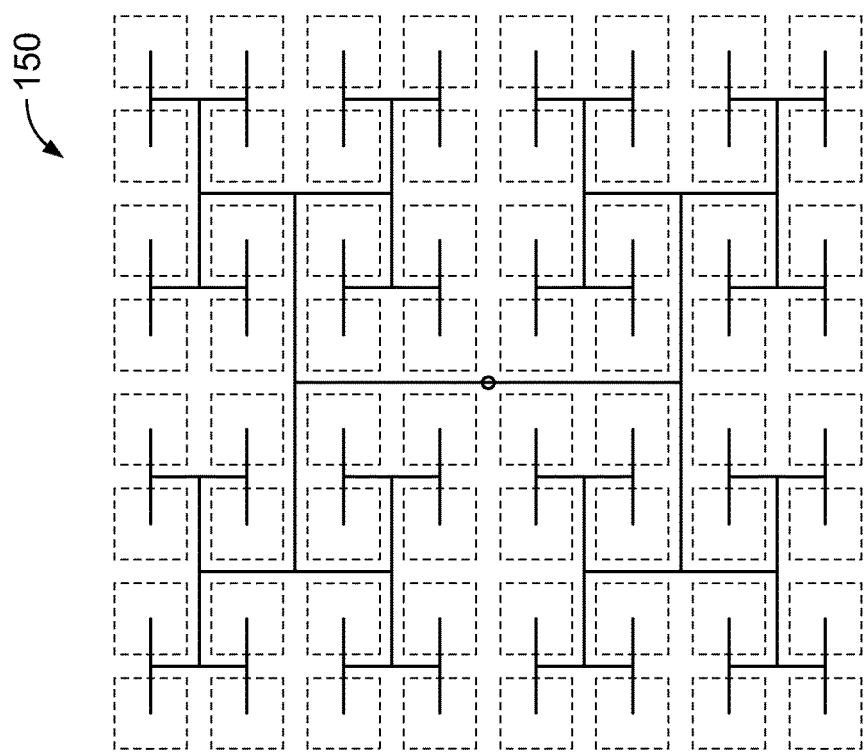
FIG. 10 shows an example block diagram illustrating a complete balanced H-tree embedded in a plane of a clock grid 150 with no wire crossover.

FIG. 10 shows an example block diagram illustrating a complete balanced H-tree embedded in a plane of a clock grid 150 with no wire crossover. The clock wire segments can be partitioned into planes, as a balanced H-Tree can be routed entirely within the plane, with no wire cross-overs, as shown in FIG. 10. Thus H-Trees can be constructed in a single plane of the clock grid 150, e.g., by using wire segments that are associated with the same number, and only the first 3 multiplexer inputs that are connected to wire segments in the same plane (e.g., plane N) as shown in FIG. 9.

Figure 11:
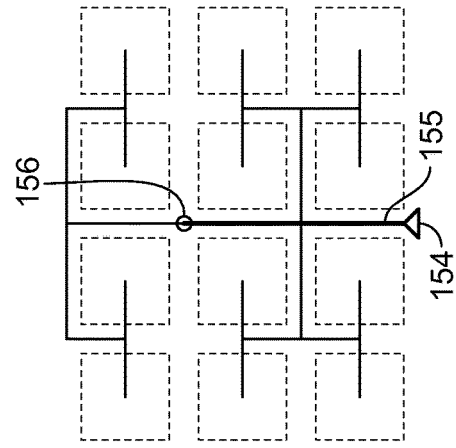
FIGS. 11-12 shows example block diagrams illustrating various configurations that allow additional flexibility to the structure in FIG. 10.
Figure 12:
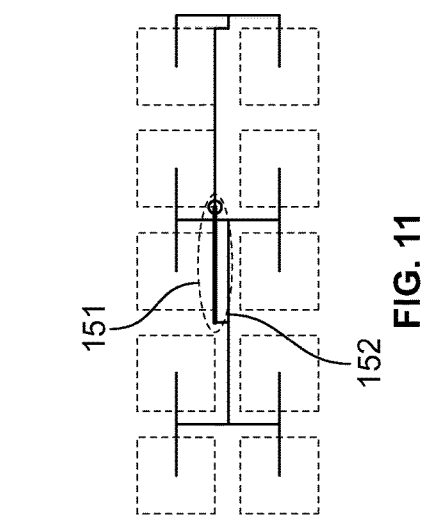

FIGS. 11-12 show example block diagrams illustrating various configurations that allow additional flexibility to the structure in FIG. 10. Additional flexibility afforded by the next 4 multiplexer inputs connected to plane N+1 (e.g., 135a-d in FIG. 9) can be used to build optimal balanced trees for irregular clock regions, as shown in FIG. 11 (e.g., another plane 151 is used in the same clock channel in addition to plane 152), or to have an additional wire segment 155 to route the clock signal from the clock source 154 to the root 156 of the clock tree, as shown in FIG. 12 (an additional clock plane can be used to route from the clock source to the root of the tree that may overlap a wire segment routing the clock signal down from the root, similar to planes 151-152 in FIG. 11, not illustrated in FIG. 12). This additional flexibility can be obtained in a number of ways, but it is important that the additional multiplexer inputs are connected to clock segments in all 4 adjacent channels. For example, the 4 connections to plane N+1 may be chosen and can accommodate a number of complex designs.

In another implementation, the additional 4 inputs can choose a different plane instead of plane N+1, e.g., N+ any prime number, which is equivalent to renumbering the wire segments, as long as all 4 adjacent channels can be reached via the sequence of the additional connections. It is also possible for plane N to connect to planes $N+d_0$, $N+d_1$, $N+d_2$, and $N+d_3$ (modulo 32) in the 4 adjacent channels, where the d's can be different numbers.

Figure 13:
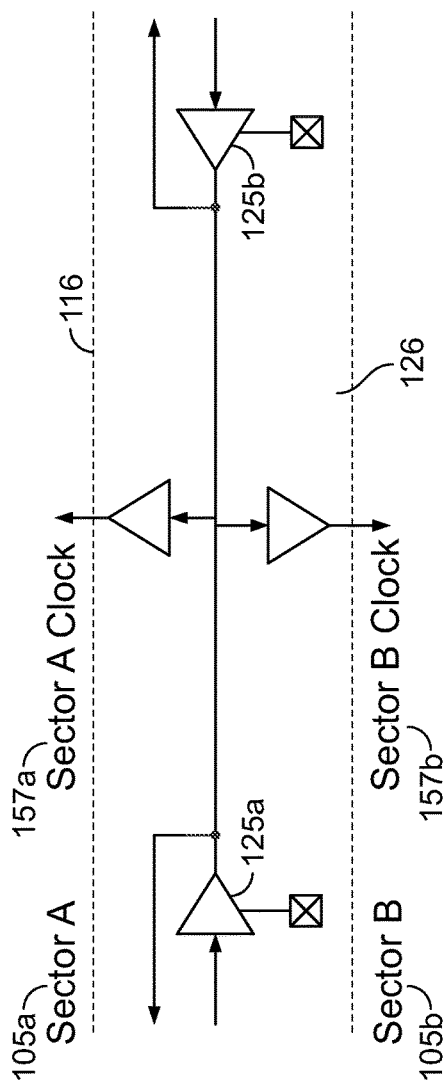
FIG. 13 shows an example circuit diagram illustrating sector clocks connected to clock segments in an adjacent clock channel.

FIG. 13 shows an example circuit diagram illustrating sector clocks connected to clock segments 126 in an adjacent clock channel 116. Clock signals can be delivered to individual sectors via a clock tree configured using the clock grid. Sectors 105a-b are adjacent to a segment of the clock tree (e.g., wire segment 126) to access the clock signals 157a-b, respectively. For balanced clock trees, the segment 126 is a leaf of the clock tree. As shown in the example in FIG. 13, the clock signals 157a-b in the clock channel 116 are available to the sectors 105a-b, respectively.

In some instances, the sector(s) 105a-b may access at most a subset of the signals transmitted along wire segments 126 in clock channel 116, e.g., at most 16. Multiplexers may be used to perform a selection of any 16 of the 32 available clock signals from the wire segments in the clock channel.

Figure 14:
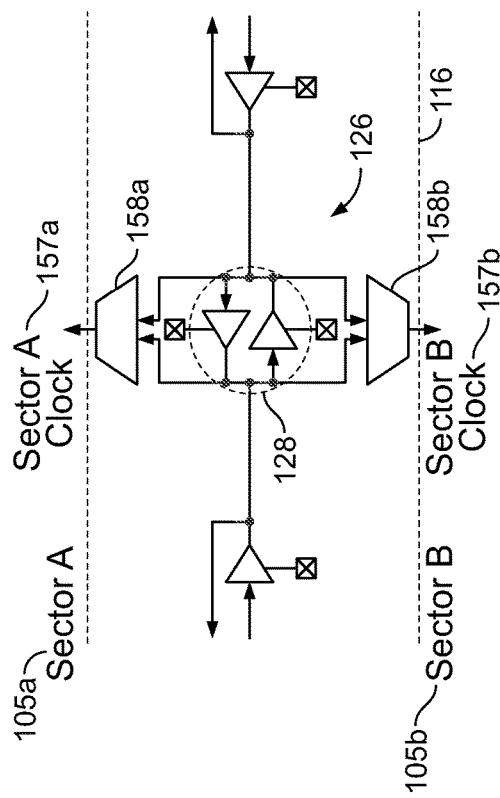
FIGS. 14-15 show an example circuit diagram illustrating connecting a clock wire segment to a sector clock at a bi-directional clock buffer.
Figure 15:
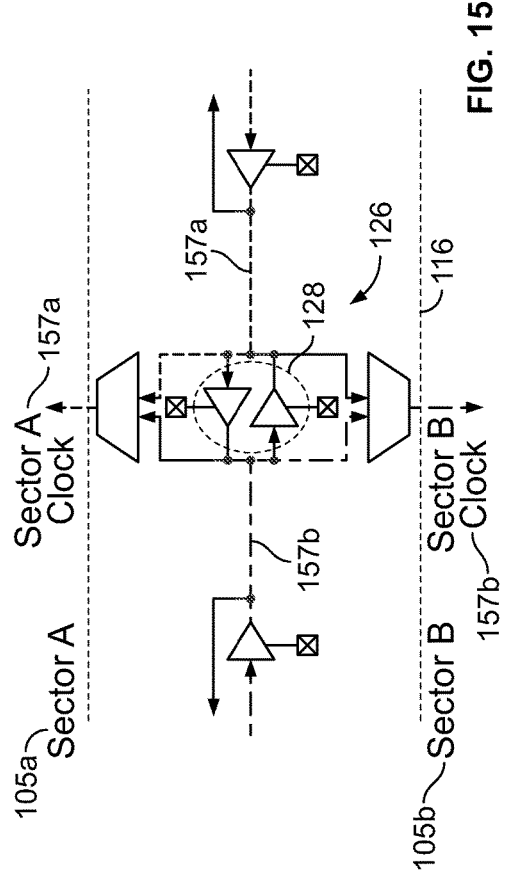

FIGS. 14-15 show an example circuit diagram illustrating connecting a clock wire segment to a sector clock at a bidirectional clock buffer. A clock wire segment 126 in a clock channel 116 can be buffered with an additional bidirectional buffer 128, e.g., as described in FIG. 6, the sector clock signals 157a-b can be routed in a manner as described in FIG. 13. The 2:1 multiplexers 158a-b allow a clock signal to be tapped before being buffered, regardless of the direction that the clock is being driven, such that all paths can be balanced. This structure also allows two different clock signals 157a-b to share a single clock segment 126 in a clock channel 116. As shown in FIG. 15, a first clock signal 157b is driven from the left end of the wire segment 126 and selected by one of the sectors 105b, and a second signal 157a is driven from the right end of the wire segment 126 and selected by the other sector 105a. In this case, both buffers of the bidirectional buffer 128 are disabled.

In some instances, clock trees constructed in the configurable clock grid are driven from clock sources that may be located anywhere on the device. The clock source is connected to the clock grid and then routed to the root of the clock tree. Clock signals can be connected to the clock grid (inserted) in different ways. For example, each multiplexer 131 shown in FIG. 8 driving a clock segment 133 can have an input 136 that can be connected to a clock source. A clock signal is routed to the input 136 using conventional wires such as the programmable interconnect found in a programmable device. As shown in FIGS. 13-15, the connection of the clock grid to the sector can be done on more than one side of the sector, or even the corners. In the respective example in FIGS. 13-15, the connection is provided on opposite sides of the sector, for example on the left and right sides of all sectors.

Figure 16:
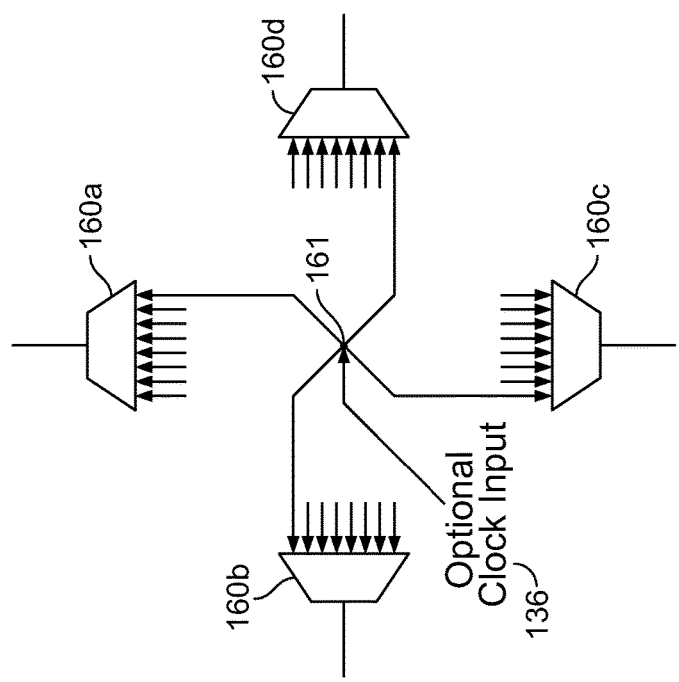
FIG. 16 shows an example circuit diagram illustrating routing clock signals into a clock grid via a clock grid multiplexer.

FIG. 16 shows an example circuit diagram illustrating routing clock signals into a clock grid via a clock grid multiplexer when the clock source is located within a sector. The multiplexers 160a-d can be analogous to the 8:1 multiplexer 131 in FIG. 8. As shown in FIG. 16, the clock source can be located within a sector, e.g., at a position of 161. Or alternatively, an optional clock input 136 can be connected and thus fed a clock signal to the multiplexers 160a-d. The clock source located within a sector can be connected to all four multiplexers 160a-d, which allows the clock signal to be inserted on a wire segment in any direction, and allows the clock signal input to be connected directly to the root 161 of a clock tree.

Figure 17:
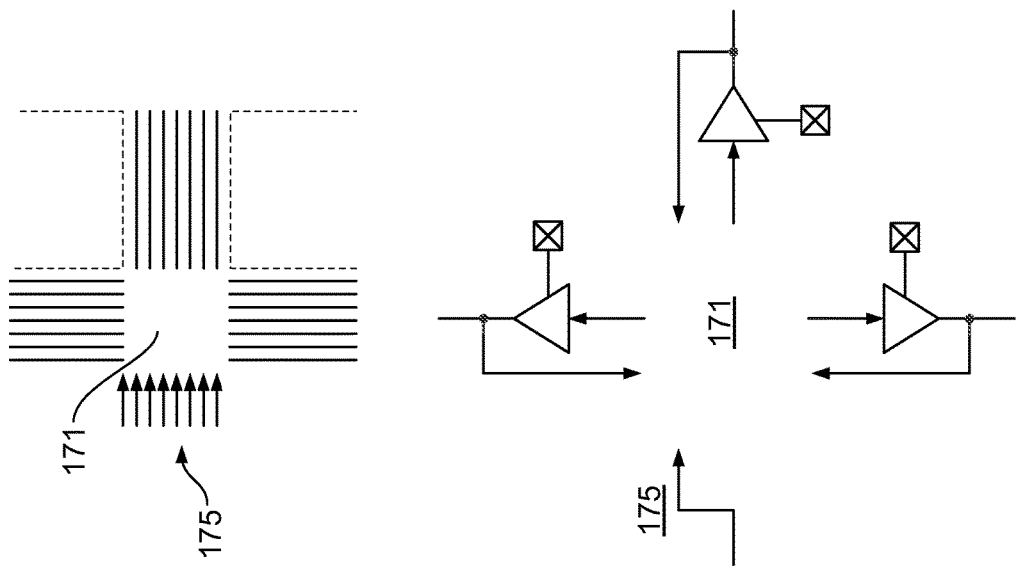
FIG. 17 shows an example circuit diagram illustrating an alternative way to insert clock signals into the clock grid.

FIG. 17 shows an example circuit diagram illustrating an alternative way to insert clock signals into the clock grid, e.g., at the grid periphery connecting clock sources at the periphery of the clock grid. The clock wire segments that would lie outside the grid are replaced by input wires and the buffers driving those wire segments are removed. Clock sources 175 connected to these input wires can then be inserted into the clock grid. As shown in FIG. 17, the clock sources 175 can connect to the grid; and since there is no clock wire segment to the left of the intersection 171 (which can be similar to the CB 107 in FIG. 3), the buffer is removed, and the input 175 is used as a clock source, and can be can be connected to the buffers at the intersection 171 in a similar manner as wire segments connections in CB 107 as discussed in connection with FIG. 3.

Figure 18:
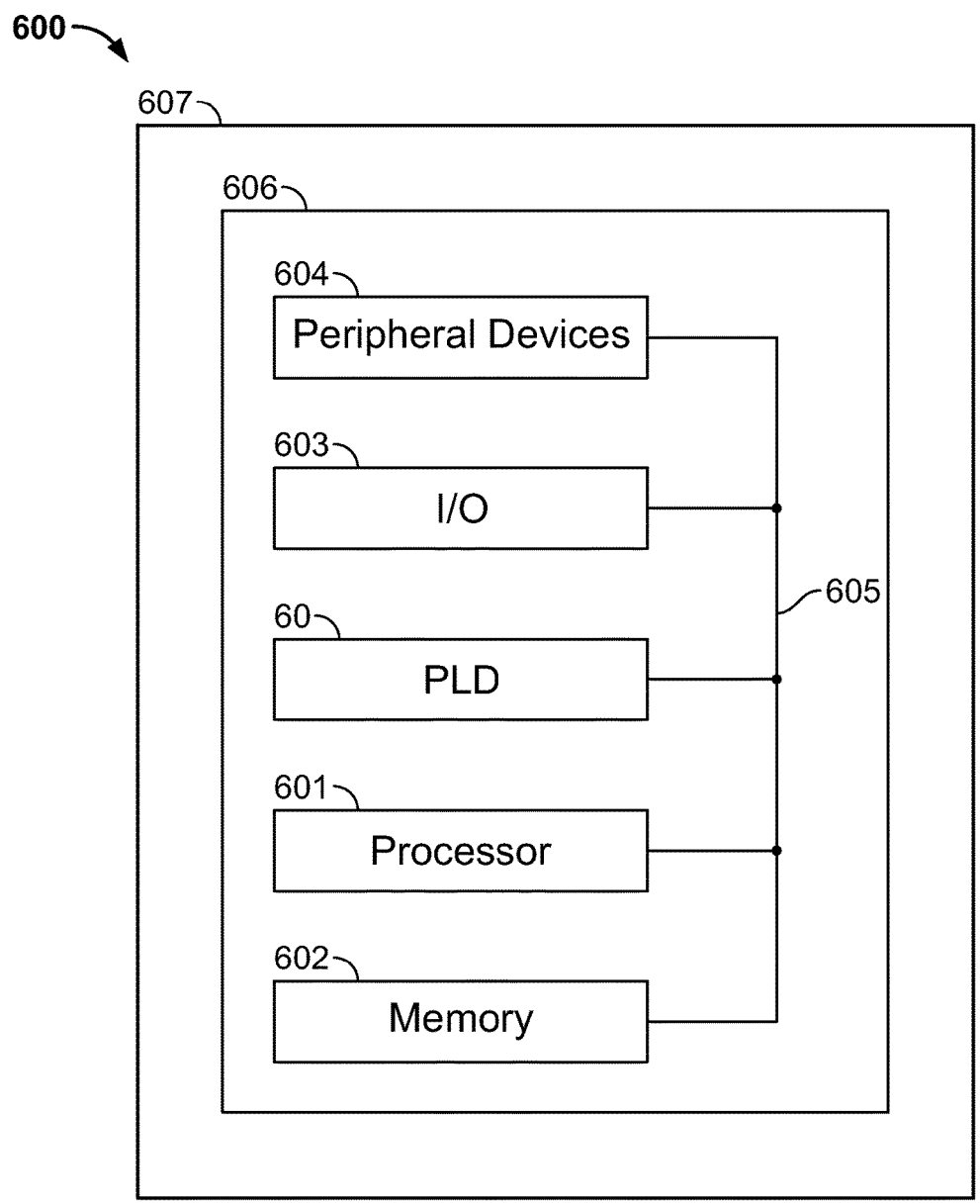
FIG. 18 is a simplified block diagram of an exemplary system employing a programmable logic device incorporating the present invention.

FIG. 18 is a simplified block diagram of an exemplary system employing a programmable logic device incorporating the present invention. A PLD 60 configured to include arithmetic circuitry according to any implementation of the present invention may be used in many kinds of electronic devices. One possible use is in an exemplary data processing system 600 shown in FIG. 6. Data processing system 600 may include one or more of the following components: a processor 601; memory 602; I/O circuitry 603; and peripheral devices 604. These components are coupled together by a system bus 605 and are populated on a circuit board 606 which is contained in an end-user system 607.

System 600 can be used in a wide variety of applications, such as computer networking, data networking, instrumentation, video processing, digital signal processing, Remote Radio Head (RRH), or any other application where the advantage of using programmable or reprogrammable logic is desirable. PLD 60 can be used to perform a variety of different logic functions. For example, PLD 60 can be configured as a processor or controller that works in cooperation with processor 601. PLD 60 may also be used as an arbiter for arbitrating access to shared resources in system 600. In yet another example, PLD 60 can be configured as an interface between processor 601 and one of the other components in system 600. It should be noted that system 600 is only exemplary, and that the true scope and spirit of the invention should be indicated by the following claims.

Various technologies can be used to implement PLDs 60 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. An integrated circuit device comprising:
   a clock source that generates a first clock signal;
   a first clock region comprising first circuitry that operates based at least in part on the first clock signal;
   a second clock region comprising second circuitry that operates based at least in part on the first clock signal; and
   a clock tree communicatively coupled to the clock source, the first clock region, and the second clock region, wherein the clock tree comprises:
      a first clock plane comprising a first plurality of wire segments, wherein the first clock plane routes the first clock signal from the clock source to a root of the clock tree;
      a second clock plane comprising a second plurality of wire segments that at least partially overlap with the first plurality of wire segments, wherein the second clock plane:
         routes the first clock signal from the root to the first clock region via a first leaf; and
         routes the first clock signal from the root to the second clock region via a second leaf; and
      a circuit connection block that selectively routes the first clock signal from the first clock plane to the second clock plane to facilitate balancing the first leaf and the second leaf.

2. The integrated circuit device of claim 1, wherein the circuit connection block selectively routes the first clock signal from the first clock plane to the second clock plane to facilitate:
   reducing clock skew between the first clock signal when routed to the first clock region and when routed to the second clock region; and
   synchronizing operation of the first clock region and the second clock region.

3. The integrated circuit device of claim 1, wherein:
   the first a clock region comprises a first set of registers that receives the first clock signal from the first leaf; and
   the second clock region comprises a second set of registers that receives the first clock signal from the second leaf.

4. The integrated circuit device of claim 1, comprising a third clock region, wherein:
   the third clock region comprises third circuitry that generates the first clock signal;
   the third clock region is at a first location in the integrated circuit device; and
   the root is at a second location in the integrated circuit device more central between the first clock region and the second clock region compared to the first location to facilitate reducing timing variation on the first clock signal when communicated to the first clock region and when communicated to the second clock region.

5. The integrated circuit device of claim 1, wherein:
   the clock source is located peripheral to the clock tree; and
   the root is at a centralized location of the clock tree to facilitate reducing clock skew.

6. The integrated circuit device of claim 1, wherein the clock tree comprises a balanced H-tree structure, an unbalanced H-tree structure, a fish-bone structure, or any combination thereof.

7. The integrated circuit device of claim 1, comprising:
   a first sector comprising the first clock region and a third clock region, wherein:
      the third clock region comprises third circuitry that operates based at least in part on a second clock signal different from the first clock signal;
      the first leaf comprises a first wire segment adjacent the first sector; and
      the first sector receives the first clock signal from the first wire segment, distributes the first clock signal to the first clock region, receives the second clock signal from the first wire segment, and distributes the second clock signal to the third clock region; and
   a second sector comprises the second clock region, wherein:
      the second leaf comprises a second wire segment adjacent the second sector; and
      the second sector receives the first clock signal from the second wire segment and distributes the first clock signal to the second clock region.

8. The integrated circuit device of claim 1, comprising a third clock region, wherein:
   the third clock region comprises third circuitry that operates based at least in part on a second clock signal different from the first clock signal;
   the clock tree comprises a third clock plane comprising a third plurality of wire segments that routes the second clock signal to the third clock region;
   the circuit connection block is communicatively coupled to the third clock plane; and
   the circuit connection block comprises a first multiplexer communicatively coupled to the first clock plane and the second block plane, but not the third clock plane.

9. The integrated circuit device of claim 8, wherein:
   the first multiplexer comprises a first input communicatively coupled to a first wire segment in the first clock plane; and
   the circuit connection block comprises a second multiplexer, wherein the second multiplexer comprises:
      a second input communicatively coupled to a second wire segment in the second clock plane;
      a third input communicatively coupled to a first output of the first multiplexer; and
      a second output communicatively coupled to a third wire segment in the second clock plane.

10. The integrated circuit device of claim 1, wherein the first leaf comprises:
   a first wire segment adjacent a first sector comprising the first clock region;
   a first buffer on a first end of the first wire segment, wherein the first buffer facilitate transmission of clock signals along the first wire segment in a first direction; and
   a second buffer on a second end of the first wire segment, wherein the second buffer facilitates transmission of first clock signals along the first wire segment in a second direction opposite to the first direction.

11. The integrated circuit device of claim 10, wherein the first leaf comprises:
- a bidirectional buffer coupled to the first wire segment between the first buffer and the second buffer; and
- a first input multiplexer communicatively coupled between the first sector and the bidirectional buffer, wherein the first input multiplexer facilitates balancing the first leaf and the second leaf by selectively tapping the first clock signal either before the first clock signal is buffered by the bidirectional buffer or after the first clock signal is buffered by the bidirectional buffer.

12. The integrated circuit device of claim 11 comprising a second sector, wherein:
- the second sector is adjacent the first wire segment, wherein second sector comprises a third clock region that operates based at least in part on a second clock signal different from the first clock signal;
- the clock tree comprises a second input multiplexer communicatively coupled between bidirectional buffer and the second sector, wherein the second input multiplexer selectively taps the second clock signal either before the second clock signal is buffered by the bidirectional buffer or after the second clock signal is buffered by the bidirectional buffer; and
- the first input multiplexer taps the first clock signal before the first clock signal is buffered by the bidirectional multiplexer and the second input multiplexer taps the second block signal before the second clock signal is buffered by the bidirectional multiplexer to enable the first wire segment to simultaneously communicate the first clock signal and the second clock signal.

13. An integrated circuit device comprising:
- a first clock plane that routes a first clock signal to a first sector and to a second sector in the integrated circuit device to enable first circuitry in the first sector and second circuitry in the second sector to operate based at least in part on the first clock signal, wherein the first clock plane comprises:
  - a first wire segment adjacent the first sector; and
  - a bidirectional buffer disposed on the first wire segment; and
- a first multiplexer communicatively coupled between the bidirectional buffer and the first sector, wherein the first multiplexer comprises:
  - a first input communicatively coupled to a first side of the bidirectional buffer;
  - a second input communicatively coupled to a second side of the bidirectional buffer; and
  - a first output communicatively coupled to the first sector to enable selectively supplying the first clock signal to the first sector before the first clock signal is passed through the bidirectional buffer or after the first clock signal is passed through the bidirectional buffer to facilitate reducing clock skew compared to when the first clock signal is supplied to the second sector.

14. The integrated circuit device of claim 13, comprising:
- a second clock plane that routes the first clock signal from a clock source to a clock tree root at a more centralized location to facilitate reducing the clock skew, wherein the second clock plane comprises a second wire segment; and
- a circuit connection block disposed at an intersection of the first wire segment and the second wire segment, wherein the circuit connection block comprises a second multiplexer that facilitates selectively communicating the first clock signal from the first clock plane to the second clock plane to balance communication of the first clock signal to the first sector and communication of the first clock signal to the second sector.

15. The integrated circuit device of claim 14, comprising a third clock plane that routes a second clock signal different from the first clock signal through the integrated circuit device, wherein:
- the third clock plane comprises a third wire segment that intersects the circuit connection block; and
- the second multiplexer is communicatively coupled to the first wire segment and the second wire segment, but not the third wire segment to facilitate reducing delay introduce on the first clock signal by the second multiplexer.

16. The integrated circuit device of claim 14, wherein:
the circuit connection block comprises a third multiplexer, wherein the third multiplexer comprises a second output communicatively coupled to the first wire segment; and
the second multiplexer comprises:
- a third input communicatively coupled to the second wire segment; and
- a third output communicatively coupled to a fourth input of the third multiplexer to facilitate reducing delay introduce on the first clock signal by the third multiplexer.

17. The integrated circuit device of claim 13, wherein:
the bidirectional buffer comprises:
- a first buffer that facilitates transmission of clock signals along the first wire segment in a first direction; and
- a second buffer that facilitates transmission of clock signals along first wire segment in a second direction opposite the first direction;
the first input of the first multiplexer is communicatively coupled to a third input of the first buffer and a second output of the second buffer; and
the second input of the first multiplexer is communicatively coupled to a fourth input of the second buffer and a third output of the first buffer.

18. The integrated circuit device of claim 13, comprising a second multiplexer communicatively coupled between the bidirectional buffer and a third sector, wherein:
the third sector comprises third circuitry that operates based at least in part on a second clock signal different from the first clock signal; and
the second multiplexer comprises:
- a third input communicatively coupled to the first side of the bidirectional buffer;
- a fourth input communicatively coupled to the second side of the bidirectional buffer; and
- a second output communicatively coupled to the second sector to enable selectively supplying the second clock signal to the first sector before the second clock signal is passed through the bidirectional buffer or after the second clock signal is passed through the bidirectional buffer.

19. The integrated circuit device of claim 18, wherein:
the first multiplexer connects the first input to the first output; and
the second multiplexer connects the second output to the fourth output to enable the first wire segment to simultaneously communicate the first clock signal in a first direction and the second clock signal in a second direction opposite the first direction.

20. An integrated circuit device comprising:
a first clock plane comprising a first wire segment and a second wire segment;
a second clock plane comprising a third wire segment;
a third clock plane comprising a fourth wire segment; and
a circuit connection block disposed at an intersection of the first wire segment, the third wire segment, the fourth wire segment, and the second wire segment, wherein:
the circuit connection block comprises a first multiplexer that selectively connects one of the second wire segment and the third wire segment to the first wire segment to facilitate reducing clock skew when a first clock signal is routed to first circuitry and second circuitry that both operate based at least in part on the first clock signal; and
the first multiplexer is not communicatively coupled to the fourth wire segment to facilitate reducing delay introduced on the first clock signal by the first multiplexer.

21. The integrated circuit device of claim 20, wherein the first multiplexer comprises:
a first input communicatively coupled to the second wire segment;
a second input communicatively coupled to the third wire segment; and
an output communicatively coupled to the first wire segment.

22. The integrated circuit device of claim 20, wherein the circuit connection block comprises a second multiplexer, wherein:
the second multiplexer comprises a first input communicatively coupled to the third wire segment; and
the first multiplexer comprises:
a second input communicatively coupled to the second wire segment;
a third input communicatively coupled to a first output of the second multiplexer; and
a second output communicatively coupled to the first wire segment.

23. The integrated circuit device of claim 20, comprising:
a bi-directional buffer disposed on the first wire segment;
a first 2:1 multiplexer communicatively coupled between the bi-directional buffer and the first circuitry; and
a second 2:1 multiplexer communicatively coupled between the bi-directional buffer and third circuitry that operates based at least in part on a second clock signal different from the first clock signal.

24. The integrated circuit device of claim 23, wherein:
the first 2:1 multiplexer taps the first clock signal from the first wire segment before the first clock signal enters the bi-directional buffer; and
the second 2:1 multiplexer taps the second clock signal from the first wire segment before the second clock signal enters the bi-directional buffer to enable simultaneously transmitting the first clock signal in a first direction along the first wire segment and the second clock signal in a second direction along the first wire segment.

25. The integrated circuit device of claim 22, wherein:
the second clock plane at least partially overlaps the first clock plane; and
the second clock plane routes the first clock signal from a clock source to a clock tree root at a more centralized location between the first circuitry and the second circuitry to enable the first clock plane to route the first clock signal from the clock tree root to the first circuitry and the second circuitry with reduced clock skew.

* * * * *